United States Patent Office 3,806,411
Patented Apr. 23, 1974

3,806,411
ENZYMATIC TREATMENT OF PROTEIN
MIXTURES CONTAINING ORGOTEIN
Wolfgang Huber, San Francisco, Silver H. Chow, Sunnyvale, and Mark G. Saifer, Berkeley, Calif., assignors to Diagnostic Data, Inc., Mountain View, Calif.
No Drawing. Filed July 19, 1972, Ser. No. 273,278
Int. Cl. C12b 1/00
U.S. Cl. 195—5                                       13 Claims

ABSTRACT OF THE DISCLOSURE

Mixtures of proteins containing orgotein are subjected to the enzymatic activity of proteolytic enzymes, thereby selectively degrading the extraneous proteins.

BACKGROUND OF THE INVENTION

This invention relates to a process for the production and purification of orgotein.

Orgotein is the non-proprietary name assigned by the United States Adopted Name Council to members of a family of water-soluble protein congeners in substantially pure, injectable form, i.e., substantially free from other proteins.

From recent literature data, it is now apparent that this family of metalloproteins includes the proteins previously isolated in various states of purity and given the names hemocuprein and hepatocuprein, Mann & Keilin, Proc. Royal. Soc. for Biol. Sci., 126, 303 (1939); cerebrocuprein; Porter & Ainsworth, J. Neurochem., 1, 260 (1957); erythrocuprein, Markowitz et al., J. Biol. Chem., 234, 40 (1959); and cytocuprein, Carrico & Deutsch, J. Biol. Chem., 244, 6087 (1969). For other references, see Mohamed & Greenberg, J. Gen. Physiol. 37, 433 (1954); Porter & Folch, Arch. Neurol. Psychiat. 77, 8 (1957); Porter & Ainsworth, J. Neurochem., 5, 91 (1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell & Deutsch, J. Biol. Chem., 240, 4299 (1965); ibid., 240, 4306 (1965); Stansell & Deutsch, Clin. Chem. Acta, 14, 598 (1966); McCord & Fridovich, J. Biol. Chem., 244, 5753 (1969); Hartz & Deutsch, J. Biol. Chem., 244, 4565 (1969); McCord & Fridovich, J. Biol. Chem., 244, 6056 (1969); Carrico & Deutsch, ibid., 245, 723 (1970). Some of these metalloproteins have been reported to possess very high superoxide dismutase activity. See McCord & Fridovich, J. Biol. Chem., 244, 6049 (1969); Keele, McCord and Fridovich, J. Biol. Chem., 245, 6176 (1970); ibid., 246, 2875 (1971).

In British Pat. 1,160,151, U.S. Pats. 3,637,640 and 3,579,495, there are disclosed multistep processes for the isolation of orgotein from a mixture of soluble proteins. In U.S. Pat. 3,637,641 and U.S. Pat. 3,624,251, there are disclosed processes for the removal of residual traces of proteinaceous impurities from orgotein by post-heat treatment at about 70° C. or by weakly basic ion exchange chromatography (DEAE-cellulose) at about pH 6 with a gradient of ionic strength.

The instant process is an extremely simple procedure for isolating and purifying orgotein.

SUMMARY OF THE INVENTION

According to this invention, a mixture of proteins comprising orgotein is subjected to the enzymatic action of a proteolytic enzyme, thereby selectively enzymatically degrading the extraneous proteins in the mixture.

DETAILED DISCUSSION

Surprisingly, for all practical purposes orgotein is substantially inert to degradation by proteolytic enzymes. Because of this fact, any proteolytic enzyme can be employed in the process of this invention. Included are crude or purified exopeptidases and endopeptidases and mixtures thereof including lucine-aminopeptidases and other aminopeptidases, carboxypeptidases A and B, pepsin, trypsin, α-chymotrypsin, chymotrypsin B, aminopolypeptidase, prolinase, prolidase, cathepsins, leucyl peptidase, dipeptidase, papain, bromelain, ficin, aclepain, mexicain, pomiferain, plasmin, tetrahymena proteinase, *B. subtillis* proteinase, *Ps. aeruginosa* proteinase, Streptococcus proteinase, *Streptomyces griseus* proteinase, e.g., "Pronase," etc., or partially purified tissue extracts, e.g., pancreatin, spleen, or kidney proteolytic enzyme extracts.

Preferred are *Strep. griseus* proteinase, pancreatin, subtilism, papain, and bromelain. Of these, especially preferred are pancreatin, which is especially suitable for removing large amounts of proteinaceous impurities. The purified proteinases, e.g., "Pronase," are especially suitable for removing small amounts of residual proteins from substantially pure orgotein.

As will be obvious, since proteolytic enzymes are themselves proteins, the instant process initially is a "trading" of proteinaceous impurities. However, the enzymes generally are self-degrading and can therefore be readily separated from the orgotein, e.g., by dialysis, or have charge or size properties which allow their ready separation. Moreover, the weight ratio of enzyme employed to proteins proteolytically degraded in the protein mixture usually is less than one. See Chance, Advanc. Enzymol., 12, 153, 171 (1951). Therefore, the net effect is to convert substantially or completely the extraneous proteins from the starting mixture of proteins into low molecular weight fragments while retaining the orgotein.

A means of avoiding this "trading" of proteinaceous impurities is to employ an insolubilized enzyme, e.g., pancreatin or a proteinase, by coupling to an insoluble support. See Emery, A. N. and Kent, C. A., Birmingham Univ. Chem. Eng., 21, 71–76 (1970).

The process of this invention can employ mixtures of soluble proteins containing any proportion of orgotein, including those containing less than 5% and preferably less than 1% orgotein, e.g., the total mixture of soluble proteins extracted from a source of orgotein, e.g., red blood cells or tissue, e.g., liver, striated muscle, kidney, heart muscle, lung tissue and intestines; partially purified extracts, e.g., those containing, e.g., 5–50% orgotein; and those consisting predominantly, i.e., more than 50%, of orgotein, including partially purified orgotein and substantially pure orgotein, e.g., 90% or higher purity. Thus, the process of this invention can be employed as part of a process for the isolation of orgotein or to eliminate trace amounts of proteinaceous impurities from already isolated, substantially pure orgotein. In one preferred aspect, the process of this invention employs as a starting material the aqueous solution of soluble proteins comprising orgotein extracted from a source thereof, preferably liver and most preferably beef liver. In another preferred aspect, it is used to isolate orgotein from a mixture of proteins enriched in orgotein, i.e., to purify partially isolated orgotein from a blood or tissue extract, e.g., liver or erythrocytes, which has been heated to precipitate thermolabile proteins.

In a preferred aspect of this invention, because of its efficiency, the enzymatic treatment is employed to eliminate a majority, preferably at least 80% of the extraneous proteins from a mixture of proteins containing only a very small percentage of orgotein, i.e., less than 5%, e.g., about 0.01% to 1%. Examples of such mixtures are the total soluble proteins extracted from a source of orgotein, e.g., red blood cells, kidneys and preferably liver, especially beef liver.

An economically significant aspect of this invention derives from the more effective use of subsequent chromatographic procedures. Without pre-fractionation, only about 4 gm. equivalents of liver soluble proteins can be chromatographed on 1 ml. of DEAE cellulose. After predigestion with proteases, this amount can be increased by 5 to 10 fold, at least.

For a description of methods of extracting a mixture of soluble proteins comprising orgotein from natural sources thereof and isolating substantially pure orgotein therefrom, see, e.g., British 1,160,151 and U.S. 3,579,495, and U.S. 3,637,640.

In an especially preferred embodiment, the soluble proteins are those remaining after a heat treatment of the total mixture of extracted soluble proteins, e.g., at 60–80° C., for example, as described in U.S. 3,624,251 or U.S. 3,579,495.

The starting mixture of proteins comprising orgotein is subjected to the enzymatic action of the selected proteolytic enzyme under any conditions of pH, temperature, time and ratio of proteins to enzyme which are operable for the selected enzyme. These conditions are well known in the art.

The starting mixture of proteins can be employed in any aqueous solvent in which the orgotein is soluble and stable. A buffer, e.g., pH 1–13, preferably 4–10, e.g., 5–6 or about 7.5, desirably containing a small amount of one or more divalent metals having an ionic radius from 0.65 to 1.00 A., e.g., Co, Cu, Fe, Ge, Mg, Ni, Zn, or Ca, and preferably having an ionic strength less than 0.1 M, is preferably employed.

The mixture of proteins comprising orgotein can be employed at any convenient concentration in the selected aqueous solvent, e.g., as low as 0.01% to 10% or higher. The solution preferably has an ionic strength of 0.001 M–0.1 M, which can be provided by a salt, e.g., NaCl, or a buffer, e.g., tris, tris-glycine, phosphate, and desirably contains one or more divalent metals having an ionic radius of 0.65–1.00 A., e.g., Mn, Cu, Zn and/or Mg.

being dependent upon the enzymatic activity of the selected enzyme and the proportion of extraneous proteins in the mixture.

The thus-purified orgotein can be isolated or further purified in a variety of ways. The proteolytically degraded proteins, whether oligopeptides or amino acids, are readily separated from the thus-purified orgotein, e.g., by one or more of ion-exchange or gel chromatography, solvent or ammonium sulfate fractional precipitation, and/or by ultrafiltration or membrane dialysis, preferably at least the latter because it is rapid, efficient and inexpensive.

If proteinaceous impurities remain, they can be separated, preferably after dialysis to remove the proteolytically degraded proteins, by adsorption on and sequential elution from a weakly basic or weakly acidic ion exchange column, e.g., in the manner described in the examples hereinafter. Other techniques which can be employed are gel filtration chromatography; solvent, e.g., acetone or ethanol, or ammonium sulfate fractional precipitation; and heating, e.g., at 70–75° C., as described in U.S. 3,624,251, to precipitate remaining proteinaceous impurities.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example I

One kg. of beef liver was blended with 2 liters of 0.025 M Tris buffer, pH 7.5, in 0.3 M sucrose and 0.05 M KCl. The suspension was centrifuged at 13,000 x G for 1–2 hours. The cloudy supernatant had a volume of 2150 ml. and a pH of 6.3.

100 ml. portions of the supernatant (60 mg. proteins/ml., 0.15 mg.–0.3 mg. orgotein/ml.) was digested at ambient temperature for about 20 hours with the proteolytic enzymes shown in the table below. The selected amount of each enzyme was based on their relative costs (2 cents/ml., except pancreatin at 1 cent/ml.), rather than their expected efficiency, since a primary objective was to develop a commercial process with the greatest economic advantage.

TABLE I

| No. | Enzyme | Amount of enzyme (per 100 ml. of liver extract) Milligrams | Grams | pH, buffer | Purification,[1] fold |
|---|---|---|---|---|---|
| a | Strep. griseus proteinase (pronase) | 200 | | 8.0 with 1 M Tris, 1 ml. 0.1 M Ca++ (final vol. 114 ml.) | 100 |
| b | Pancreatin | | 15 | 7.5 with 1 M Tris (final vol. 150 ml.) | 20 |
| c | Subtilisin | 40 | | 7.5 with 1 M Tris (final vol. 105 ml.) | 10 |
| d | Hog peptidase | 166 | | 7.0 with 1 M Tris (final vol. 112 ml.) | 1.5 |
| e | Papain (from *Carica papaya*) | 16 | | 6.3 (final vol. 100 ml.) | 7 |
| f | Bromelain (ananase) | | 9 | 5.2 with 1 M sodium acetate pH 5.0 (136 ml.) | 7 |

[1] Complete purification corresponds to about 300 fold.

The enzymatic degradation is usually conducted at about 20–40° C. However, lower and higher temperatures, e.g., 0–60° C., can be employed, the optimum temperature depending on the activity and stability of the selected enzyme.

The ratio of enzyme to starting mixture of proteins depends primarily upon the ratio of orgotein to extraneous proteins in the starting mixture, i.e., the greater the proportion of extraneous proteins in the starting mixture, the more enzyme will be required. The amount of enzyme is also dependent upon the activitiy of the selected enzyme. The optimum proportion can be calculated from the known proteolytic activity of the enzyme and the amount of extraneous proteins desired to be degraded in the mixture and generally is independent of the concentration of the orgotein therein. Usually, a weight ratio of enzyme to starting mixture of proteins of less than 1, e.g., 1:2 to 1:1,000, is employed, the exact ratio as stated above Electrophorogram analysis (after dialysis to remove degraded proteins and filtration) of the enzyme converted supernatant showed that with the amounts employed, Pronase and pancreatin eliminated the most proteinaceous impurities, subtilisin was next most efficient, followed by papain and bromelain. Poorest results were obtained with hog peptidase. The protein impurities remaining after digestion with pancreatin and bromelain are most easily removed by DEAE-cellulose ion exchange chromatography.

Example II 408 gm. of fresh liver was blended with 816 ml. of 0.025 M Tris, pH 7.5, in 0.3 M sucrose and 0.05 M KCl. The suspension was centrifuged at 13,000×G for 1 hr. The cloudy supernatant has a volume of 800 ml. and a pH of 6.3.

100 ml. portions of the supernatant, containing 15–30 mg. of orgotein, was subjected for 2 days at 37° C. to digestion with an amount of a proteolytic enzyme under the conditions shown in the table below (0.1% of sodium azide added as a preservative), followed by dialysis.

TABLE II

| No. | Enzyme | Amount of enzyme (100 ml. extract) Milligrams | Grams | pH, buffer | Resulting purification after digestion, fold |
|---|---|---|---|---|---|
| a | Pronase | 40 | | pH 8.0 with 1 M Tris; 1 ml. 0.1 M Ca++. | 20 |
| b | Pancreatin | | 6 | pH 7.5 with 1 M Tris. | 20 |
| c | Subtilisin | 8 | | do | 10 |
| d | Papain | 3.2 | | pH 6.2 | 5 |

Best results were obtained with pancreatin, Pronase and subtilisin. Again, the residual protein was most easily removed from the pancreatin digest by DEAE-cellulose ion exchange chromatography.

Example III 300 gm. of liver was blended with 600 ml. of 0.025 M Tris; 0.025 M glycine in 0.01 M Mn++ pH 7.5. The slurry was centrifuged. The residue was much better packed in this buffer. The supernatant (110 mg. proteins/ml.) measured 570 ml. Portions were subjected to enzymatic digestion with pancreatin or Pronase of the concentrations shown below and then dialyzed to separate the orgotein from the degraded proteins.

TABLE III

| No. | Enzyme | Conditions | Amount of enzyme (100 ml. extract), milligrams | Purification fold |
|---|---|---|---|---|
| a | Pronase | 38° C., pH 8.0 with 1 M Tris; 0.1% Na azide; 0.001 M Ca++. | 2 | 3 |
| b | do | do | 4 | 5 |
| c | Pancreatin | 38° C., pH 7.5 with 1 M Tris; 0.1% Na azide. | 300 | 20 |
| d | do | do | 600 | 20 |

Pancreatin was nearly equally effective at all concentrations tested (3–150 mg./ml.). Pronase was less effective when diluted from 2 mg./ml. to .02 or .04 mg./ml.

Example IV

Beef liver was blended with 0.025 M Tris, 0.025 M glycine in 0.01 M Mn++, pH 7.5, in a ratio of 2 ml. buffer per gm. of liver. The slurry was centrifuged at 0° C., 20,000×G for 60 min. (extracted proteins, 60 g./liter of supernatant; orgotein, ca. 150 mg./liter). A stock solution of pancreatin (100 mg./ml.) (Grade VI, from hog pancreas; activity equivalent to 4×NF) in 0.05 M Tris-HCl buffer pH 7.5 was prepared. The supernatant of the beef liver extract, pH of 6.7, was titrated to pH 7.5 with 1 M Tris. To every 100 ml. of beef liver extract was added 6 ml. (0.6 g.) of pancreatin stock solution and 1 ml. of 10% sodium azide. The mixture (pH 7.5) was incubated at 37° C. for 2 days, during which time the color of the mixture changed from red to brown. (Residual protein, about 3 g./l.; orgotein, ca. 150 mg./l.)

The incubation mixture was then dialyzed against deionized water overnight and finally into 0.005 M phosphate buffer pH 6.0 (col. buffer). The dialyzate was centrifuged at 0° C., 20,000×g for 1 hr., and then filtered through Versapore microfilter. The filtrate has a pH of 6.3 and a conductivity of approximately 250 μmho.

The orgotein content of the proteins remaining therein was greater than 5% compared to about 0.2% in the soluble proteins extracted from the starting slurry. Pure orgotein was isolated from the filtrate in the manner described below.

A small DEAE 52 diethylaminoethyl cellulose ion exchange column of 8.5 ml. bed volume was packed. It was equilibrated with 0.005 M phosphate buffer, pH 6.0. Flow rate was approximately 20 ml. per hour. 253 ml. of the above-described filerate, equivalent to 82 gm. of liver was loaded on the column (9.6 gm. liver/ml.). The column was then washed with 30 ml. of 0.005 M phosphate buffer pH 6.0. Orgotein was eluted with a linear gradient from 0.005 M phosphate, pH 6.0, to 0.005 M phosphate in 0.075 NaCl, pH 6.0, in a total volume of 170 ml. The position of the orgotein peak was located with NBT enzyme stain and impurities by coomassie blue protein stain on agarose electropherograms. The tubes containing orgotein and essentially no impurities were pooled into one fraction, and those that contain orgotein together with some impurities into another fraction. Both fractions were each dialyzed, stabilizing sucrose added, if desired, filtered and lyophilized.

The yield of pure orgotein was 27.6 mg. (0.034% based on the starting liver; 62% of theoretical). The yield of substantially pure orgotein was 10.0 mg. (0.012%; 22% of theoretical), giving a total recovery of orgotein of 84% theoretical.

The substantially pure orgotein can be recycled or further purified by an enzymatic treatment with another proteolytic enzyme, e.g., Pronase, or by gel or ion exchange chromatography.

Example V

Follow the procedure of Example I or II, employing an amount of Pronase coupled to acetyl-cellulose or carboxymethyl cellulose hydrazide (Enzite) enzymatically equivalent to the Pronase employed in that example. After digestion, separate the Pronase by filtration and isolate the orgotein from the filtrate in the manner described above.

Example VI

Follow the procedure of Example V, employing a 1% solution of orgotein (70–97% purity) containing residual extraneous proteins, in 0.025 M Tris, 0.025 M glycine and .001 M CaCl$_2$. After two days at 37° C., the orgotein solution is completely free of extraneous proteins. Pure orgotein is isolated by filtration, dialysis and lyophilization.

Example VII

Separate the soluble proteins from the insolubles in beef liver in the manner described in Example IV, or after cell disruption by sonification, or by high pressure filtration. After centrifugation adjust the pH of the supernatant to 6.0 and rapidly heat to 65–80° C. and maintain at that temperature for 15–90 minutes. Cool to 37° C. and remove the copious precipitate by centrifugation or filtration. (Residual proteins, <10% of extracted proteins; orgotein, ca. 200 mg./l.)

Adjust the pH of the heat-treated extract to 7.5 with 1 M Tris buffer and add thereto at 37° C. about 3 g. of pancreatin or about 50 mg. of Pronase per liter of extract. After two days, cool to room temperature and dialyze as described in Example IV. The dialyzate contains orgotein which can be isolated therefrom, if desired, by chromatography over DEAE-cellulose ion exchange column, e.g., as described in Example IV.

Example VIII

Follow the procedure of Example VII, except heat the total mixture of homogenized beef liver and aqueous extract prior to centrifugation instead of after, thereby eliminating one of the separation steps. This variation reduces by greater than 80% the extraneous proteins extracted concurrently with the orgotein from the liver.

Example IX

Follow the procedure of Example VII or VIII, except employ first pancreatin and then, two days later, Pronase adsorbed on an insoluble support in the enzyme treatment step, each in the amounts set forth in Example VII.

Example X

Follow the procedure of Example VIII except reduce the volume of extracting buffer by 25–75%.

Example XI

Follow the procedure of Example VIII, substituting a like weight of washed, packed bovine, equine or human erythrocytes for liver as starting material.

Example XII

Follow the procedures of Examples I–IV or VII–XI, except that after pancreatin digestion, fractionally precipitate with 1/2 and 1½ v./v. of acetone to further reduce extraneous proteinaceous impurities and to further concentrate the orgotein. Subsequent chromatographic purification, e.g., DEAE-cellulose, of the precipitate, can be performed with a sample load of at least 30 gm. equivalents of liver per ml. of adsorbent.

Example XIII

To determine the effect of conducting the proteolytic digestion step at various stages of isolation of the orgotein, whole beef liver, the soluble proteins from beef liver and heat treated soluble proteins from beef liver were subjected to an enzymatic purification with pancreatin.

To obtain an extract of the soluble proteins from beef liver, 500 g. (150 g. solids) of beef liver was blended in a blender with one liter of a buffer solution of 0.25 M Tris, 0.025 M glycine and 0.01 M Mn++, pH 7.5, to give 1,380 g. ml. of slurry. 100 ml. portions of the resulting slurry were subjected to one of the following:

(A) The slurry is centrifuged, 13,000 g. for 1 hour, to yield 78 ml. (ca. 6 g. solids, about ⅔ total) of supernatant, containing 100% of the soluble proteins and 100% of the orgotein in the starting liver.

(B) The 78 ml. of supernatant from Step (A) is subjected to proteolytic degradation with 300 mg. pancreatin; pH 7.5; 37° C.; 24–48 hours. 100% of the orgotein and <10% of the total soluble proteins of the starting liver remain.

(C) 100 ml. of the starting liver slurry is subjected to a heat treatment at 65° C. for 15 minutes; cooled and centrifuged to yield 78 ml. of supernatant and 7.6 g. (89.5%) of precipitated insoluble proteins. The 78 ml. of supernatant is then subjected to the enzymatic treatment of Step (B). 100% of the orgotein and <6% of the total soluble proteins of the starting liver remain.

(D) The 78 ml. of supernatant from the centrifugation step of Step (A) is subjected to the heat treatment step of Step (C). Centrifugation yields 60 ml. (2.70 g. solids) of supernatant and 2.05 g. of ppt. The 60 ml. of supernatant is then subjected to the proteolytic enzyme treatment of Step (B). There remains 3–6% of the soluble proteins.

It is apparent from the results of Example XIII that a heat treatment step prior to the enzymatic treatment renders the latter more efficient because in (C) and (D) only 3–6% of the total soluble proteins remained whereas in (B) more than 6% remained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the isolation or purification of orgotein, which comprises the steps of subjecting an aqueous solution of a mixture comprising orgotein and other proteins to the enzymatic activity of a proteolytic enzyme for a time sufficient to selectively degrade at least a portion of said other proteins and thereafter isolating orgotein from the enzymatically degraded mixture of proteins.

2. A process according to claim 1 wherein the enzyme is *Streptomyces griseus* proteinase, pancreatin, subtilisin, papain or bromelain.

3. A process according to claim 1 wherein the enzyme is pancreatin.

4. A process according to claim 1, wherein the mixture of proteins consists predominantly of orgotein.

5. A process according to claim 4, wherein the proteolytic enzyme is *Streptomyces griseus* proteinase.

6. A process according to claim 1, wherein the mixture of proteins consists of less than 5% orgotein.

7. A process according to claim 6, wherein the starting mixture of proteins is at least a portion of the soluble proteins of liver.

8. A process according to claim 7 wherein a portion of the soluble proteins of the liver are insolubilized by a heat treatment and separated prior to the enzyme treatment step.

9. A process according to claim 7 wherein the liver is beef liver.

10. A process according to claim 7, wherein the enzyme source is pancreatin.

11. A process according to claim 9, wherein the enzyme source is pancreatin.

12. A process according to claim 1, wherein the mixture of proteins is at least a portion of the soluble proteins of red blood cells.

13. A process according to claim 12, wherein the enzyme source is pancreatin.

References Cited

UNITED STATES PATENTS

| | | | |
|---|---|---|---|
| 2,958,630 | 11/1960 | Keil et al. | 195—4 |
| 3,360,438 | 12/1967 | Goyco et al. | 195—4 |
| 3,672,954 | 6/1972 | Grippa | 195—2 |

ALVIN E. TANEHOLTZ, Primary Examiner

U.S. Cl. X.R.

195—4